United States Patent
Bae et al.

(10) Patent No.: US 11,863,475 B2
(45) Date of Patent: Jan. 2, 2024

(54) METHOD AND APPARATUS FOR DESIGNING RATE MATCHING PATTERN FOR PARTIAL DEMODULATION REFERENCE SIGNAL (DMRS) TRANSMISSION

(71) Applicant: Samsung Electronics Co., Ltd., Gyeonggi-do (KR)

(72) Inventors: Jung Hyun Bae, San Diego, CA (US); Jungmin Park, Seoul (KR)

(73) Assignee: Samsung Electronics Co., Ltd

( * ) Notice: Subject to any disclaimer, the term of this patent is extended or adjusted under 35 U.S.C. 154(b) by 5 days.

(21) Appl. No.: 16/999,835

(22) Filed: Aug. 21, 2020

(65) Prior Publication Data

US 2021/0111845 A1   Apr. 15, 2021

Related U.S. Application Data

(60) Provisional application No. 62/916,624, filed on Oct. 17, 2019, provisional application No. 62/914,959, filed on Oct. 14, 2019.

(51) Int. Cl.
  *H04L 5/00*   (2006.01)
  *H04W 72/1273*  (2023.01)
  *H04L 1/00*   (2006.01)

(52) U.S. Cl.
  CPC .......... *H04L 5/0048* (2013.01); *H04L 1/0002* (2013.01); *H04W 72/1273* (2013.01); *H04L 1/0067* (2013.01)

(58) Field of Classification Search
  CPC ... H04L 1/0002; H04L 1/0045; H04L 1/0067; H04L 5/0048; H04L 1/0046; H04L 5/0051; H04L 5/0094; H04W 72/1273
  See application file for complete search history.

(56) References Cited

U.S. PATENT DOCUMENTS

| | | |
|---|---|---|
| 9,094,978 B2 | 7/2015 | Chmiel et al. |
| 10,064,200 B2 | 8/2018 | Pourahmadi et al. |
| 10,079,665 B2 * | 9/2018 | Papasakellariou .... H04L 5/0057 |
| 10,673,666 B2 | 6/2020 | Shin et al. |

(Continued)

FOREIGN PATENT DOCUMENTS

| | | | |
|---|---|---|---|
| EP | 3962200 A1 * | 3/2022 | |
| WO | WO-2021026926 A1 * | 2/2021 | |

OTHER PUBLICATIONS

Erisson, "Remaining details on DMRS design", 3GPP TSG RAN WG1 Meeting 90bis, R1-1718448, Prague, CZ, Oct. 9-13, 2017, Total pp. 11 (Year: 2017).*

(Continued)

*Primary Examiner* — Shah M Rahman
(74) *Attorney, Agent, or Firm* — The Farrell Law Firm, P.C.

(57) ABSTRACT

An apparatus and method are provided for partial transmission of a PDSCH DMRS due to PDSCH RM. The method includes determining, by the UE, whether a downlink received from a base station is rate matched; and in response to determining that the downlink is rate-matched, determining, by the UE, that a rate matching pattern of the downlink is applicable for partial transmission of a reference signal, and decoding, by the UE, the downlink with a partial transmission of the reference signal.

19 Claims, 4 Drawing Sheets

(56) References Cited

U.S. PATENT DOCUMENTS

| | | | |
|---|---|---|---|
| 2014/0036849 A1* | 2/2014 | Ribeiro | H04W 72/1263 370/329 |
| 2014/0133395 A1* | 5/2014 | Nam | H04L 5/0023 370/328 |
| 2015/0098369 A1* | 4/2015 | Song | H04L 5/0053 370/280 |
| 2016/0119936 A1* | 4/2016 | Kim | H04W 72/005 370/329 |
| 2016/0135194 A1* | 5/2016 | Kim | H04L 5/0082 370/329 |
| 2016/0323895 A1* | 11/2016 | Pourahmadi | H04W 72/082 |
| 2017/0302495 A1* | 10/2017 | Islam | H04L 27/2675 |
| 2017/0367046 A1* | 12/2017 | Papasakellariou | H04W 72/0446 |
| 2018/0007707 A1* | 1/2018 | Rico Alvarino | H04L 12/28 |
| 2018/0026684 A1* | 1/2018 | Wei | H04L 5/0007 370/329 |
| 2018/0054284 A1* | 2/2018 | Fröberg Olsson | H04L 5/1469 |
| 2018/0206129 A1* | 7/2018 | Choi | H04W 72/042 |
| 2019/0110290 A1 | 4/2019 | Sun et al. | |
| 2019/0149365 A1* | 5/2019 | Chatterjee | H04L 5/0094 370/329 |
| 2019/0289622 A1* | 9/2019 | Chatterjee | H04W 72/20 |
| 2019/0379431 A1 | 12/2019 | Park et al. | |
| 2019/0379506 A1* | 12/2019 | Cheng | H04W 4/02 |
| 2020/0067676 A1* | 2/2020 | Yi | H04L 1/0013 |
| 2020/0092061 A1* | 3/2020 | Wang | H04L 5/0048 |
| 2020/0112390 A1 | 4/2020 | Manolakos et al. | |
| 2020/0382354 A1* | 12/2020 | Sengupta | H04L 5/005 |
| 2021/0058953 A1* | 2/2021 | Bendlin | H04L 1/0067 |
| 2021/0195619 A1* | 6/2021 | Schober | H04W 72/082 |
| 2021/0345370 A1* | 11/2021 | Lee | H04L 1/1854 |
| 2021/0409173 A1* | 12/2021 | Chatterjee | H04L 1/1812 |

OTHER PUBLICATIONS

AT&T, "Remaining details for DMRS design", 3GPP TSG RAN WG1 Meeting 91, R1-1719637, Reno, USA, Nov. 27-Dec. 1, 2017, Total pp. 5 (Year: 2017).*

ZTE, "Discussion on downlink DMRS design", 3GPP TSG RAN WG1 Meeting #89, R1-1707130, Hangzhou, P.R. China May 15-19, 2017, Total pp. 11 (Year: 2017).*

* cited by examiner

METHOD AND APPARATUS FOR DESIGNING RATE MATCHING PATTERN FOR PARTIAL DEMODULATION REFERENCE SIGNAL (DMRS) TRANSMISSION

PRIORITY

This application is based on and claims priority under 35 U.S.C. § 119(e) to U.S. Provisional Patent Application Ser. Nos. 62/914,959 and 62/916,624, which were filed in the United States Patent and Trademark Office on Oct. 14, 2020, and Oct. 17, 2020, respectively, the entire content of each of which is incorporated herein by reference.

FIELD

The present disclosure relates generally to partial transmission of a physical downlink shared channel (PDSCH) demodulation reference signal (DMRS) due to PDSCH rate matching (RM), and more particularly, to a method and apparatus for designing an RM pattern for partial DMRS transmission.

BACKGROUND

In the 3rd Generation Partnership Project (3GPP) Release 15 5th Generation (5G) New Radio (NR) specification, some resource elements are not available for a PDSCH transmission, and information regarding these resource elements is provided to a user equipment (UE) as an RM pattern. The Release 15 specification, however, indicates that an entire DMRS for a PDSCH should be transmitted, regardless of the aforementioned PDSCH RM.

However, requiring an entire DMRS for a PDSCH to be transmitted places some restrictions on network flexibility, and as such, there has been some discussion to allowing some parts of DMRS to not be transmitted when PDSCH is rate matched.

Because the DMRS is mainly used for channel estimation (CE) for a PDSCH at a UE, loss of some part of the DMRS may negatively impact the UE's CE interpolation behavior. Further, a DMRS can also be used for noise and interference measurement for PDSCH demodulation, which can also be impacted if the entire DMRS is not transmitted.

Accordingly, a need exists for provide an effective method and apparatus for partial transmission of a PDSCH DMRS due to PDSCH RM.

SUMMARY

The disclosure is made to address at least the problems and/or disadvantages described above and to provide at least the advantages described below.

An aspect of the disclosure is to provide a method and apparatus for partial transmission of a PDSCH DMRS due to PDSCH RM.

Another aspect of the disclosure is to provide a method and apparatus, in which a number of RM patterns that can incur partial DMRS transmission is less than a total number of RM patterns configured to a UE, and such special RM patterns are indicated by a network to a UE.

Another aspect of the disclosure is to provide a method and apparatus, in which an RM pattern that can incur partial DMRS transmission is determined based on a type of the RM pattern.

Another aspect of the disclosure is to provide a method and apparatus, in which an RM pattern that can incur partial DMRS transmission is determined based on a radio resource control (RRC) state of a UE and characteristics of a PDSCH.

Another aspect of the disclosure is to provide a method and apparatus, in which support of an RM pattern incurring partial DMRS transmission is explicitly indicated by a UE as a capability.

In accordance with an aspect of the disclosure a method is provided for decoding a downlink by a UE. The method includes determining, by the UE, whether a downlink received from a base station is rate matched; and in response to determining that the downlink is rate-matched, determining, by the UE, that a rate matching pattern of the downlink is applicable for partial transmission of a reference signal, and decoding, by the UE, the downlink with a partial transmission of the reference signal.

In accordance with another aspect of the disclosure, an apparatus is provided for decoding a downlink. The apparatus includes a transceiver; and a processor configured to determine whether a downlink received from a base station is rate-matched, and in response to determining that the downlink is rate-matched, determine that a rate matching pattern of the downlink is applicable for partial transmission of a reference signal, and decode the downlink with a partial transmission of the reference signal.

In accordance with another aspect of the disclosure, a method is provided for allocating a downlink by a base station. The method includes determining, by the base station, whether a downlink transmitted to a UE is rate matched; and in response to determining that the downlink is rate-matched, determining, by the base station, that a rate matching pattern of the downlink is applicable for partial transmission of a reference signal, and allocating, by the base station, to the UE, the downlink with a partial transmission of the reference signal.

In accordance with another aspect of the disclosure, an apparatus is provided for allocating a downlink. The apparatus includes a transceiver; and a processor configured to determine whether a downlink transmitted to a UE is rate matched, and in response to determining that the downlink is rate-matched, determine that a rate matching pattern of the downlink is applicable for partial transmission of a reference signal, and allocate, to the UE, the downlink with a partial transmission of the reference signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
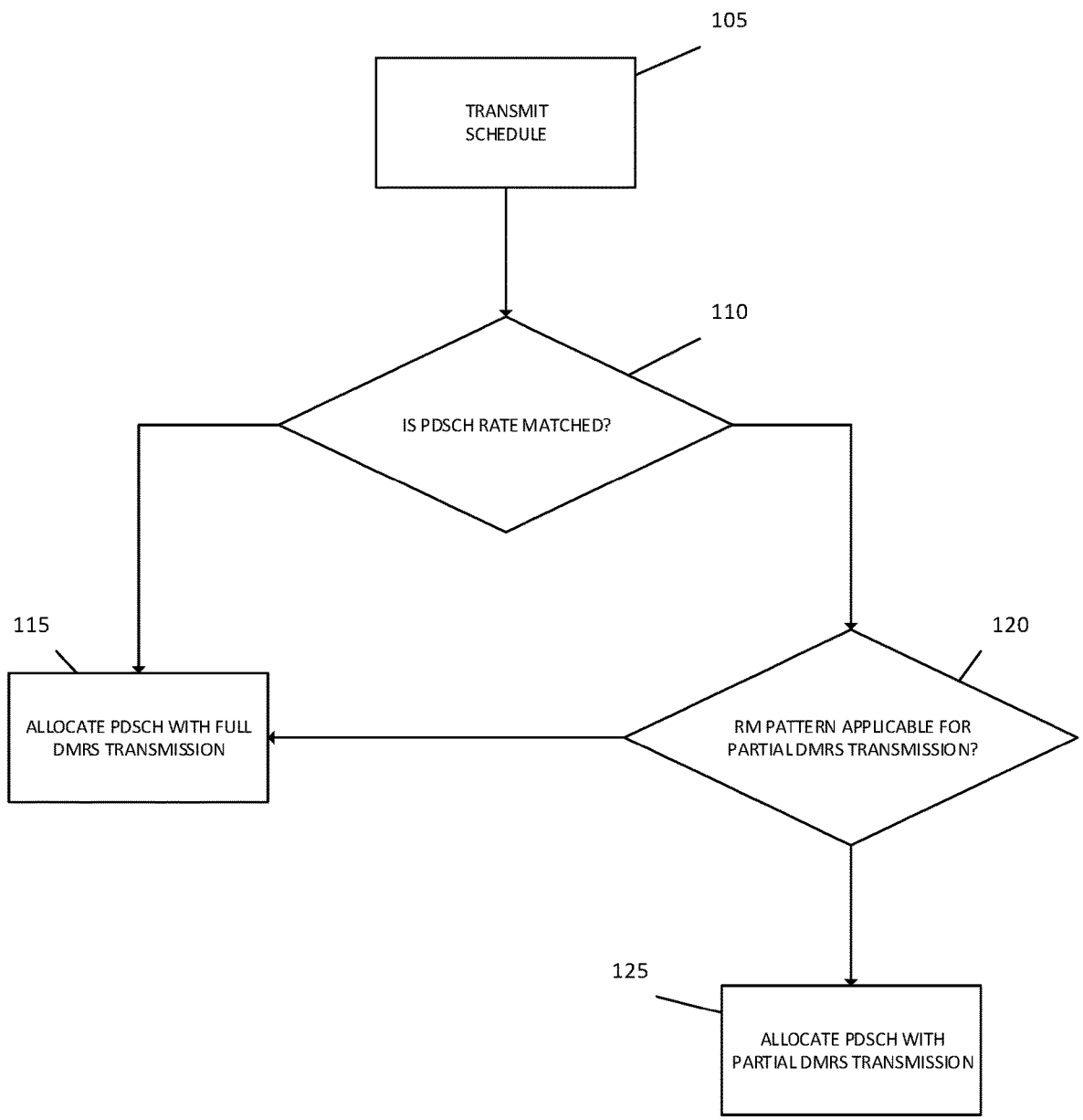
FIG. 1 is flow chart illustrating an operation of a base station allocating a PDCSH according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to an embodiment may be one of various types of electronic devices. An electronic device may include a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

As described above, when partial transmission of a PDSCH DMRS occurs, CE for the PDSCH, noise and interference measurement for PDSCH demodulation, etc., may be negatively affected. Accordingly, the present disclosure utilizes special handling at a UE side for partial DMRS transmission, limits the number of RM patterns incurring partial DMRS transmission, and indicates which RM pattern potentially incurs such partial DMRS transmission to a UE.

Certain RM patterns may not always incur partial DMRS transmission because the partial DMRS transmission will also depend on PDSCH allocation itself. However, from a UE implementation viewpoint, knowing which RM patterns can incur partial DMRS transmission is still important to prepare for potentially special handling for those RM patterns.

In the current NR specification, there are 2 types of RM patterns depending on granularity. The first is resource block (RB) symbol level, and the other is resource element (RE) level.

In addition to RB symbol level and RE level RM patterns, a synchronization signal (SS)/physical broadcast channel (PBCH) block is also considered as a type of RM pattern.

Because a UE applies different handling for different types of RM patterns, applicability of partial DMRS transmission as well as the number of those patterns, if applicable, should depend on the type of RM pattern. For example, a DMRS may always be transmitted if RM with RE level granularity is applied.

RM patterns may be further categorized in the current NR specification. For example, an RE level RM pattern can be a common reference signal (CRS) and zero power channel state information reference signal (ZP-CSI-RS), and applicability of partial DMRS transmission should depend on the type. Because CRS is an LTE signal, and a UE supporting NR should additionally acknowledge LTE operation.

Due to such special handling, applicability of partial DMRS transmission may not be allowed for an RE level RM pattern corresponding to a CRS. In the current NR specification, downlink control information (DCI) can be used to select the RM pattern, i.e., DCI-based, to be applied among high layer configured multiple patterns. Alternatively, a high layer configured RM pattern, i.e., RRC-based, may be directly applied. Applicability of partial DMRS transmission should depend on DCI-based or RRC-based. A UE may have more difficulty handling DCI-based RM pattern selection due to its dynamic nature. Therefore, DCI-based RM may be excluded or limited to a certain number for partial DMRS transmission.

In the current NR specification, there are number of configurations related to a PDSCH, and there is a need for differentiating the applicability of an RM pattern incurring partial DMRS transmission as well as the number of those patterns, if applicable, depending on those configurations.

In accordance with an embodiment of the present disclosure, for different types of PDSCHs, one or more of the following options may be utilized.

Option 1) A PDSCH can be transmitted in an RRC idle/inactive/connected state, and differentiation can be made among them. For example, for a PDSCH for remaining minimum system information (RMSI) and/or other system information (OSI), paging, etc., DMRS may always be transmitted. This may simplify a UE operation before/ without RRC connection. There can also be differentiation between RRC idle/inactive/connected regarding allowing partial DMRS transmission.

Option 2) There are 2 processing capabilities defined in the current NR specification. Capability 1 is for normal processing, and capability 2 is for fast processing. According to an embodiment of the disclosure, differentiation can be made among capability 1 and capability 2. For capability 2, partial transmission of DMRS may cause an issue due to its challenging fast processing. Hence, a DMRS may always be transmitted for a PDSCH with processing capability 2, for example.

Option 3) There are 2 mapping types A and B of PDSCH in the current NR specification, and according to an embodiment of the disclosure, differentiation can be made among mapping types A and B. For example, for mapping type B, a DMRS may always be transmitted since this mapping type can be challenging for a UE due to its flexible nature.

The aforementioned differentiation of applicability of RM patterns incurring partial DMRS transmission as well as the number of those patterns, if applicable, can explicitly be indicated by a UE as a capability.

There is also a concept of precoding granularity, i.e., certain number of consecutive RB's should use the same precoding for PDSCH transmission, which may improve a UE's CE quality. However, partial DMRS transmission, which occurs within RB's with the same precoding granularity, can create more complications at a UE. Hence, a DMRS is either entirely transmitted or is entirely absent within RB's with the same precoding. Allowing partial transmission within RB's with the same precoding may be declared as UE capability.

Accordingly, a total number of rate matching patterns that can incur partial DMRS transmission is limited, and such special rate matching patterns may be indicated by a network to a UE. Further, applicability of rate matching patterns, which can incur partial DMRS transmission, depends on certain conditions such as a type of a rate matching pattern, an RRC state of a UE, or a characteristic of a PDSCH such as the type, processing time, DMRS mapping type, etc. Additionally, support of an RM pattern incurring partial DMRS transmission is explicitly indicated by a UE as a capability.

FIG. 1 is flow chart illustrating an operation of a base station allocating a PDCSH according to one embodiment.

Referring to FIG. 1, in step 105, the base station transmits, to a UE, a schedule for a PDSCH associated with a DMRS.

In step 110, the base station determines whether the PDSCH is rate matched.

In response to determining that the PDSCH is not rate matched in step 110, the base station allocates the PDSCH with a full transmission of the DMRS.

However, in response to determining that the PDSCH is rate matched in step 110, the base station determines whether a rate matching pattern of the PDSCH is applicable for a partial transmission of the DMRS in step 120. For example, the determination as to whether the rate-matching pattern of the PDSCH is applicable for the partial transmission of the DMRS may be based on a radio resource control state of the UE and/or a characteristic of the PDSCH such as a type of the PDSCH, a processing time, and/or a DMRS mapping type.

In response to determining that the rate matching pattern of the PDSCH is applicable for the partial transmission of the DMRS in step 120, the base station allocates, to the UE, the PDSCH with a partial transmission of the DMRS.

Figure 2:
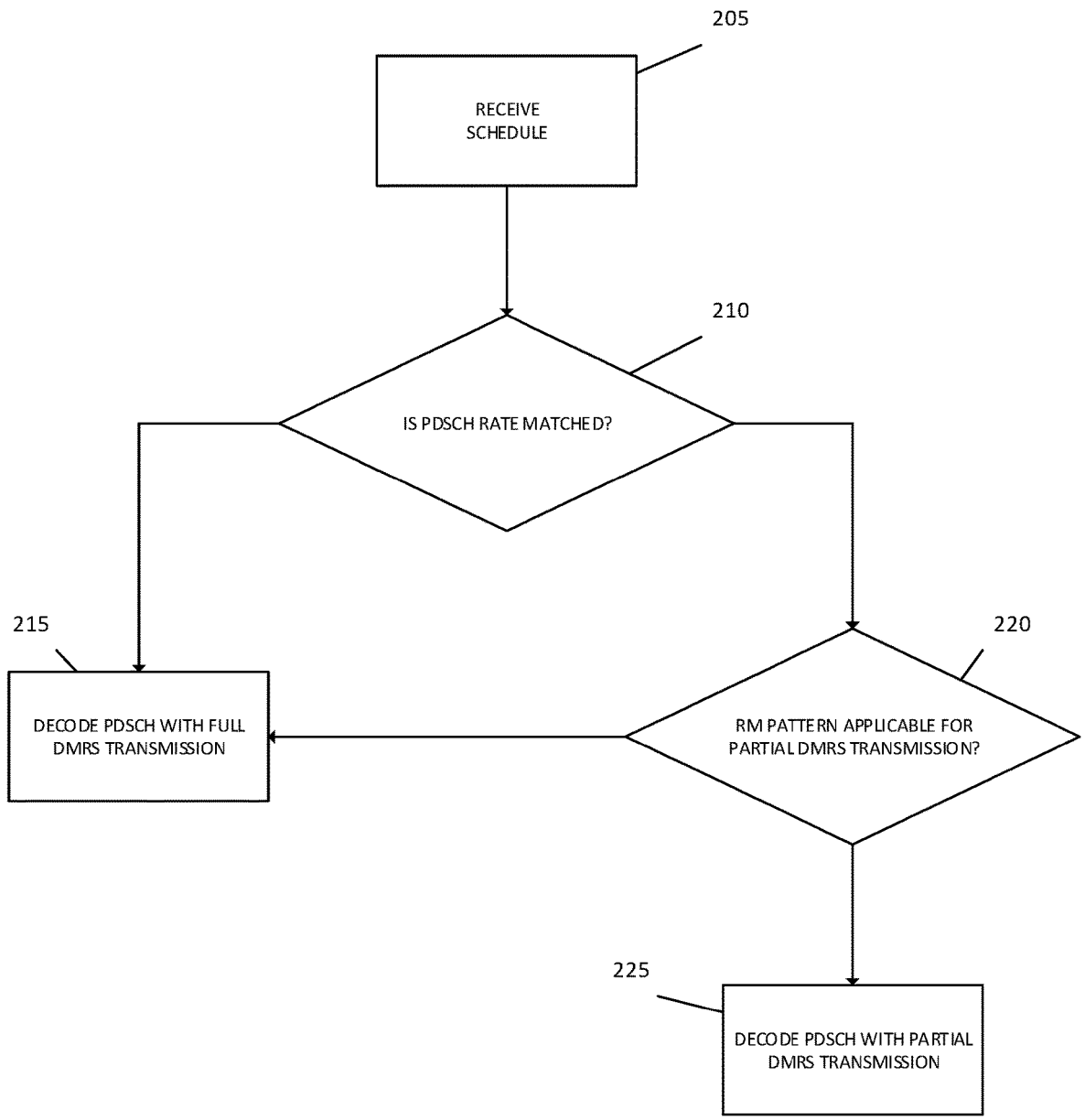
FIG. 2 is flow chart illustrating an operation of a UE decoding a PDCSH according to one embodiment.

FIG. 2 is flow chart illustrating an operation of a UE decoding a PDCSH according to one embodiment.

Referring to FIG. 2, in step 205, the UE receives, from a base station, a schedule for a PDSCH associated with a DMRS.

In step 210, the UE determines whether the PDSCH is rate matched.

In response to determining that the PDSCH is not rate matched in step 210, the UE decodes the PDSCH with a full transmission of the DMRS.

However, in response to determining that the PDSCH is rate matched in step 210, the UE determines whether a rate matching pattern of the PDSCH is applicable for a partial transmission of the DMRS in step 220. For example, the determination as to whether the rate-matching pattern of the PDSCH is applicable for the partial transmission of the DMRS may be based on a radio resource control state of the UE and/or a characteristic of the PDSCH such as a type of the PDSCH, a processing time, and/or a DMRS mapping type.

In response to determining that the rate matching pattern of the PDSCH is applicable for the partial transmission of the DMRS in step 220, the UE decodes the PDSCH with a partial transmission of the DMRS.

Figure 3:
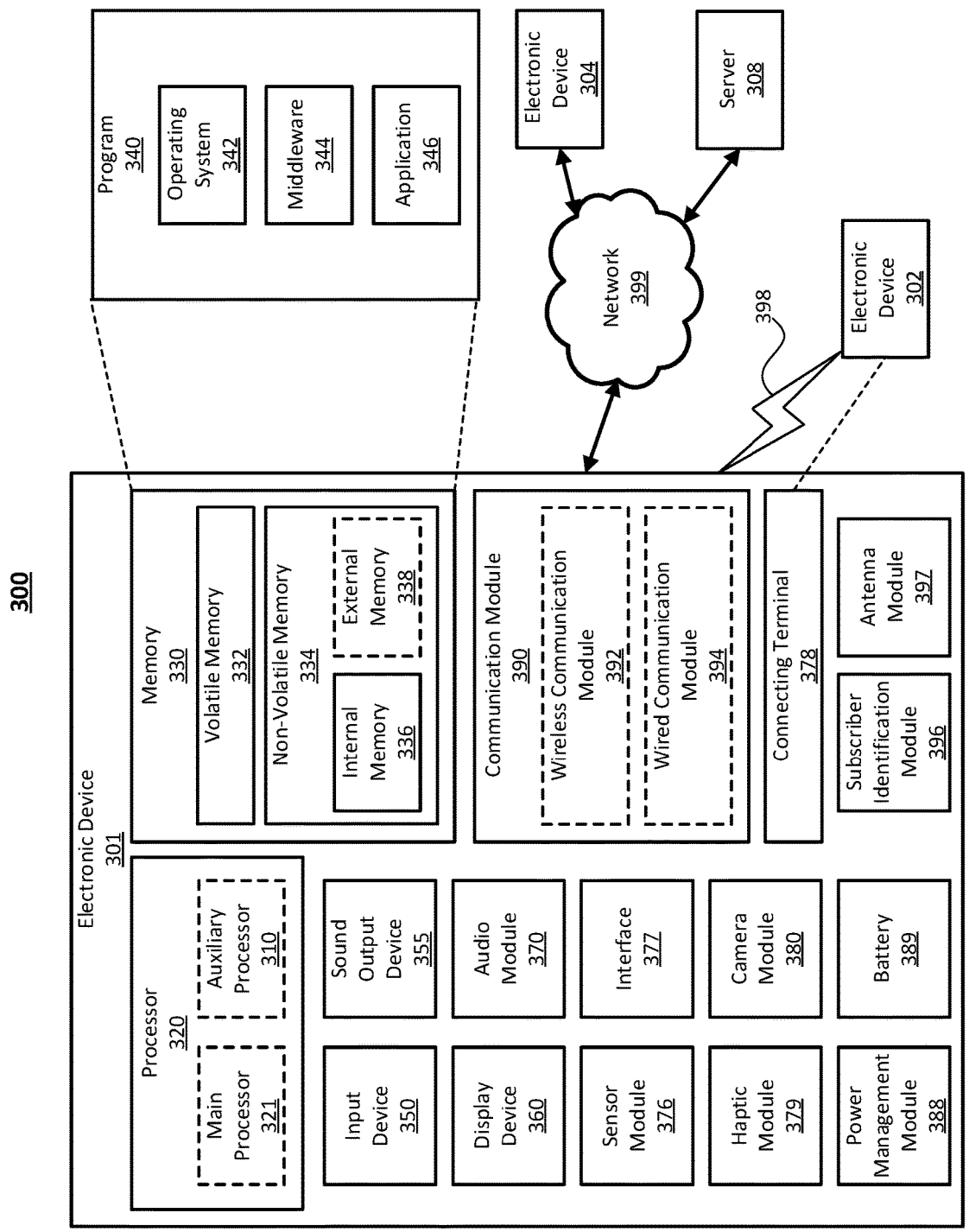
FIG. 3 illustrates an electronic device in a network environment, according to one embodiment.

FIG. 3 illustrates a block diagram of an electronic device 301 in a network environment 300, according to one embodiment.

Referring to FIG. 3, the electronic device 301 in the network environment 300 may communicate with another electronic device 302 via a first network 398 (e.g., a short-range wireless communication network), or another electronic device 304 or a server 308 via a second network 399 (e.g., a long-range wireless communication network). The electronic device 301 may also communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In one embodiment, at least one (e.g., the display device 360 or the camera module 380) of the components may be omitted from the electronic device 301, or one or more other components may be added to the electronic device 301. In one embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to one embodiment, the auxiliary processor 323 (e.g., an ISP or a CP) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by another component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to one embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to one embodiment, the audio module 370 may obtain the sound via the input device 350, or output the sound via the sound output device 355 or a headphone of an external electronic device 302 directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wired) or wirelessly. According to one embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. According to one embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to one embodiment, the haptic module 379 may include, for example, a motor, a piezoelectric element, or an electrical stimulator.

The camera module 380 may capture a still image or moving images. According to one embodiment, the camera module 380 may include one or more lenses, image sensors, ISPs, or flashes.

The power management module 388 may manage power supplied to the electronic device 301. The power management module 388 may be implemented as at least part of, for example, a power management integrated circuit (PMIC).

The battery 389 may supply power to at least one component of the electronic device 301. According to one embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more CPs that are operable independently from the processor 320 (e.g., the AP) and supports a direct (e.g., wired) communication or a wireless communication.

According to an embodiment, the communication module 390 may include a wireless communication module 392

(e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. The antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

One embodiment may be implemented as software (e.g., the program 340) including one or more instructions that are stored in a storage medium (e.g., internal memory 336 or external memory 338) that is readable by a machine (e.g., the electronic device 301). For example, a processor of the electronic device 301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

Figure 4:
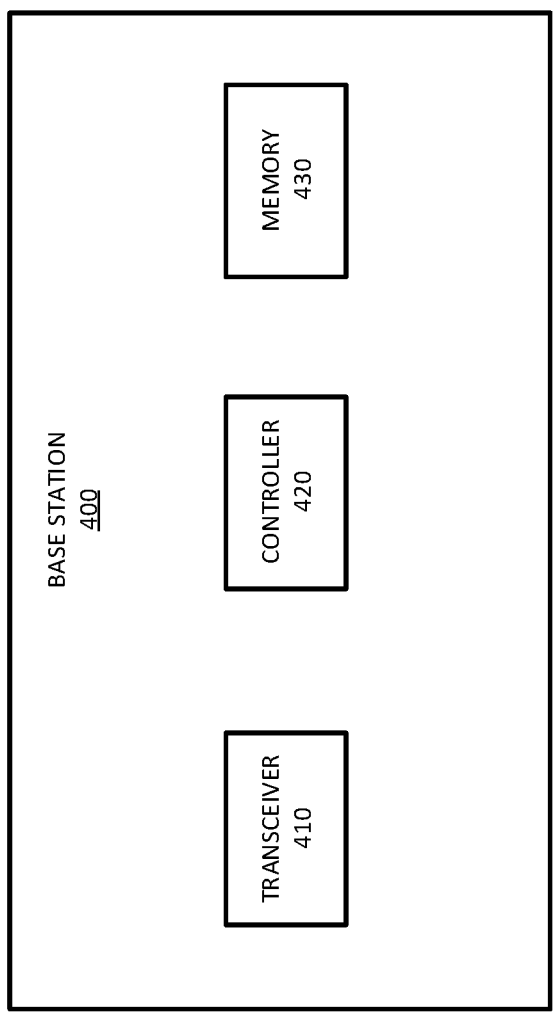
FIG. 4 illustrates a base station according to one embodiment.

FIG. 4 illustrates a base station according to one embodiment.

Referring to FIG. 4, the base station, e.g., a gNB, includes a transceiver 410, a controller 420, and a memory 430. The controller 420 may be defined as a circuit, an ASIC, or a processor.

The transceiver 410 may transmit/receive a signal to/from another network entity. The transceiver 410 may transmit system information to, e.g., the UE, and may transmit a synchronization signal or a reference signal. Further, the transceiver may transmit and receive, information related to initial access operation, random access operation, and handover operation to and from the UE.

The controller 420 may control the overall operation of the base station. The controller 420 may control to perform the operation according to the above-described flowchart of FIG. 1.

The memory 430 may store at least one piece of information transmitted/received through the transceiver 410 and information generated through the controller 420. For example, the memory 430 may store information related to a schedule for a downlink associated with a reference signal.

The memory 430 may store a basic program for the operation of a communication processor, an application, and data such as configuration information. Further, the memory 430 may include at least one storage medium among a flash memory type, a hard disk type, a multimedia card micro type, a card type memory (e.g., an SD memory, an extreme digital (XD) memory, etc.), a magnetic memory, a magnetic disk, an optical disk, a random access memory (RAM), a static RAM (SRAM), a read only memory (ROM), a programmable ROM (PROM), and an electrically erasable PROM (EEPROM).

The controller 420 may perform various operations using a variety of programs, content, and data stored in the memory.

According to one embodiment, a method of the disclosure may be included and provided in a computer program product. The computer program product may be traded as a product between a seller and a buyer. The computer program product may be distributed in the form of a machine-readable storage medium (e.g., a compact disc ROM (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to the above-described embodiments, a system and method are provided, which utilize defined conditions for applicability of rate matching patterns, which can incur partial DMRS transmission.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of decoding a downlink by a user equipment (UE), the method comprising:
    transmitting, by the UE, to a base station, an indication that the UE supports partial transmission of a reference signal;
    determining, by the UE, whether the downlink received from the base station is rate matched; and
    in response to determining that the downlink is rate-matched, determining, by the UE, that a rate matching pattern of the downlink is applicable for the partial transmission of the reference signal, and decoding, by the UE, the downlink with the partial transmission of the reference signal,
    wherein determining that the rate-matching pattern of the downlink is applicable for the partial transmission of the reference signal is based on a characteristic of the downlink,
    wherein the characteristic of the downlink includes processing time, and
    wherein the processing time includes a normal processing time and a fast processing time corresponding to the indication.

2. The method of claim 1, further comprising, in response to determining that the downlink is not rate matched, decoding, by the UE, the downlink with a full transmission of the reference signal.

3. The method of claim 1, wherein determining that the rate-matching pattern of the downlink is applicable for the partial transmission of the reference signal is further based on a radio resource control state of the UE.

4. The method of claim 1, further comprising receiving, by the UE, a schedule for the downlink associated with the reference signal.

5. The method of claim 1, wherein the determination that the rate matching pattern of the downlink is applicable for partial transmission of the reference signal is further based on a type of the rate matching pattern.

6. The method of claim 1, further comprising receiving, by the UE, an indication of rate matching patterns that incur partial transmission of the reference signal,
    wherein a number of the rate matching patterns that can incur partial DMRS transmission is less than a total number of rate matching patterns configured to the UE.

7. An apparatus for decoding a downlink, the apparatus comprising:
    a transceiver; and
    a processor configured to:
        transmit, to a base station, an indication that the UE supports partial transmission of a reference signal;
        determine whether the downlink received from the base station is rate-matched, and
        in response to determining that the downlink is rate-matched, determine that a rate matching pattern of the downlink is applicable for the partial transmission of the reference signal, and decode the downlink with the partial transmission of the reference signal,
    wherein the processor is further configured to determine that the rate-matching pattern of the downlink is applicable for the partial transmission of the reference signal based on a characteristic of the downlink,
    wherein the characteristic of the downlink includes processing time, and
    wherein the processing time includes a normal processing time and a fast processing time corresponding to the indication.

8. The apparatus of claim 7, wherein the processor is further configured to, in response to determining that the downlink is not rate-matched, decode the downlink with a full transmission of the reference signal.

9. The apparatus of claim 7, wherein the processor is further configured to determine that the rate-matching pattern of the downlink is applicable for the partial transmission of the reference signal based on a radio resource control state of the UE.

10. The apparatus of claim 7, wherein the processor is further configured to receive a schedule for the downlink associated with the reference signal.

11. The apparatus of claim 7, wherein the processor is further configured to determine that the rate matching pattern of the downlink is applicable for partial transmission of the reference signal based on a type of the rate matching pattern.

12. The apparatus of claim 7, wherein the processor is further configured to receive an indication of rate matching patterns that incur partial transmission of the reference signal, and
    wherein a number of the rate matching patterns that can incur partial DMRS transmission is less than a total number of rate matching patterns configured to the UE.

13. A method of allocating a downlink by a base station, the method comprising:
    receiving, from a user equipment (UE), an indication that the UE supports partial transmission of a reference signal;
    determining, by the base station, whether the downlink transmitted to the UE is rate matched; and
    in response to determining that the downlink is rate-matched, determining, by the base station, that a rate matching pattern of the downlink is applicable for the partial transmission of the reference signal, and allocating, by the base station, to the UE, the downlink with the partial transmission of the reference signal, wherein determining that the rate-matching pattern of the downlink is applicable for the partial transmission of the reference signal is based on a characteristic of the downlink, wherein the characteristic of the downlink includes processing time, and wherein the processing time includes a normal processing time and a fast processing time corresponding to the indication.

14. The method of claim 13, further comprising receiving, from the UE, an indication that the UE supports the partial transmission of the reference signal.

15. The method of claim 13, further comprising transmitting, to the UE, an indication of rate matching patterns that incur partial transmission of the reference signal, wherein a number of the rate matching patterns that can incur partial DMRS transmission is less than a total number of rate matching patterns configured to the UE.

16. An apparatus for allocating a downlink, the apparatus comprising:

a transceiver; and a processor configured to:

receive, from a user equipment (UE), an indication that the UE supports partial transmission of a reference signal, determine whether the downlink transmitted to the UE is rate matched, and in response to determining that the downlink is rate-matched, determine that a rate matching pattern of the downlink is applicable for the partial transmission of the reference signal, and allocate, to the UE, the downlink with the partial transmission of the reference signal, wherein the processor is further configured to determine that the rate-matching pattern of the downlink is applicable for the partial transmission of the reference signal based on a characteristic of the downlink, wherein the characteristic of the downlink includes processing time, and wherein the processing time includes a normal processing time and a fast processing time corresponding to the indication.

17. The apparatus of claim 16, wherein the characteristic of the downlink further includes a demodulation reference signal mapping type.

18. The method of claim 1, wherein the characteristic of the downlink further includes a demodulation reference signal mapping type.

19. The apparatus of claim 7, wherein the characteristic of the downlink further includes a demodulation reference signal mapping type.

* * * * *